Nov. 5, 1940.   W. S. MAYERS   2,220,454
LEHR CHARGER
Filed Feb. 14, 1938   6 Sheets-Sheet 1
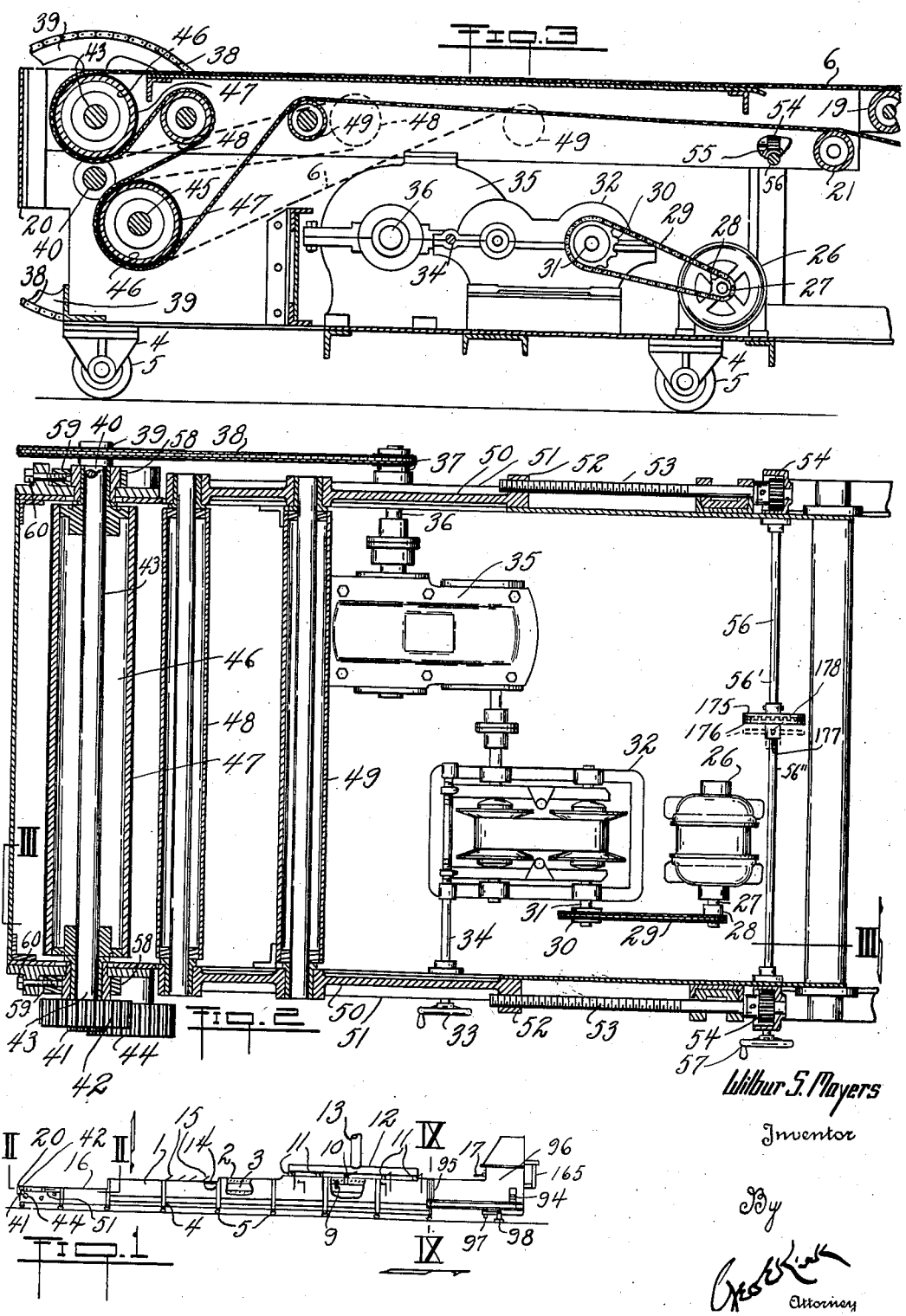
Wilbur S. Mayers
Inventor
By
Attorney

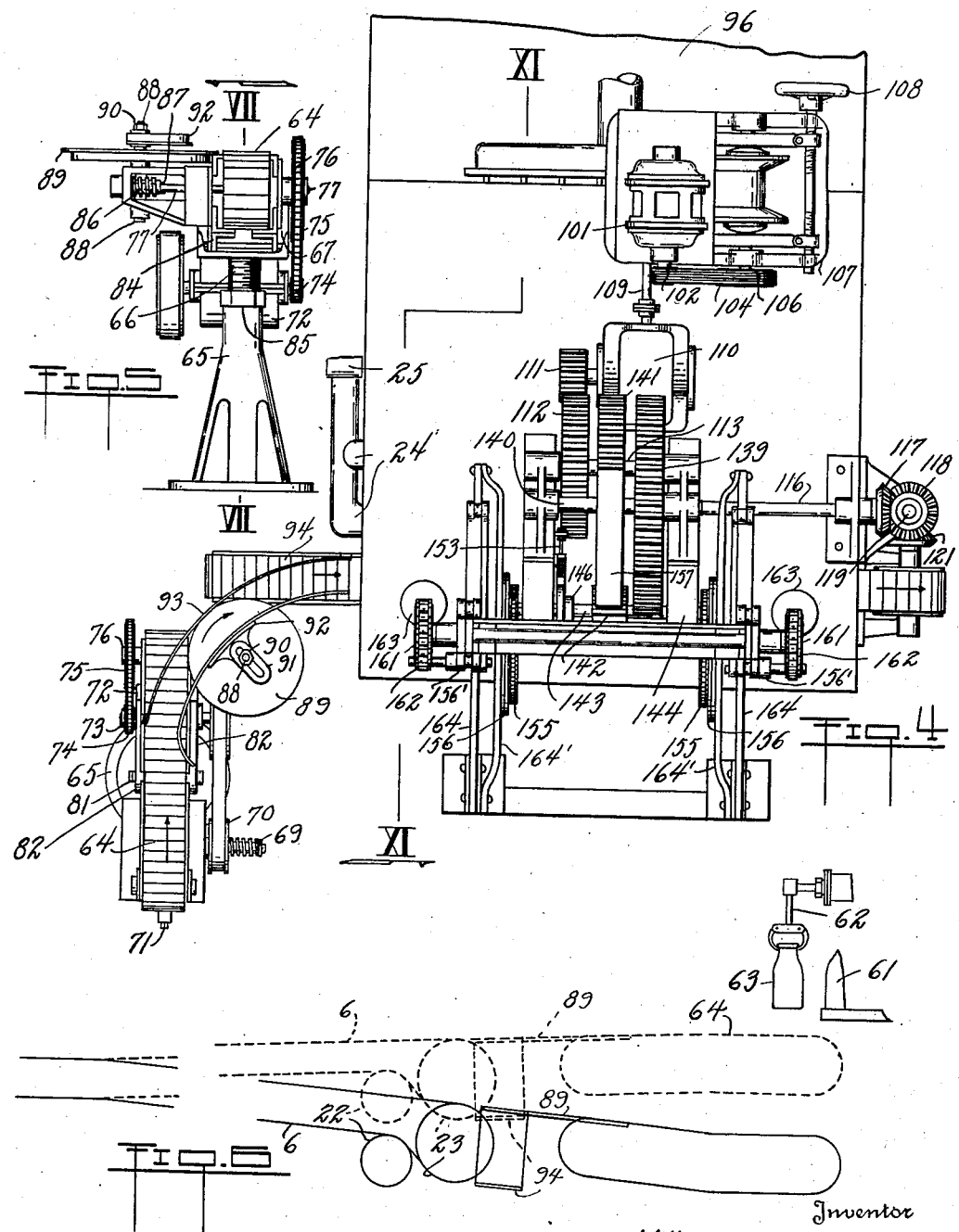

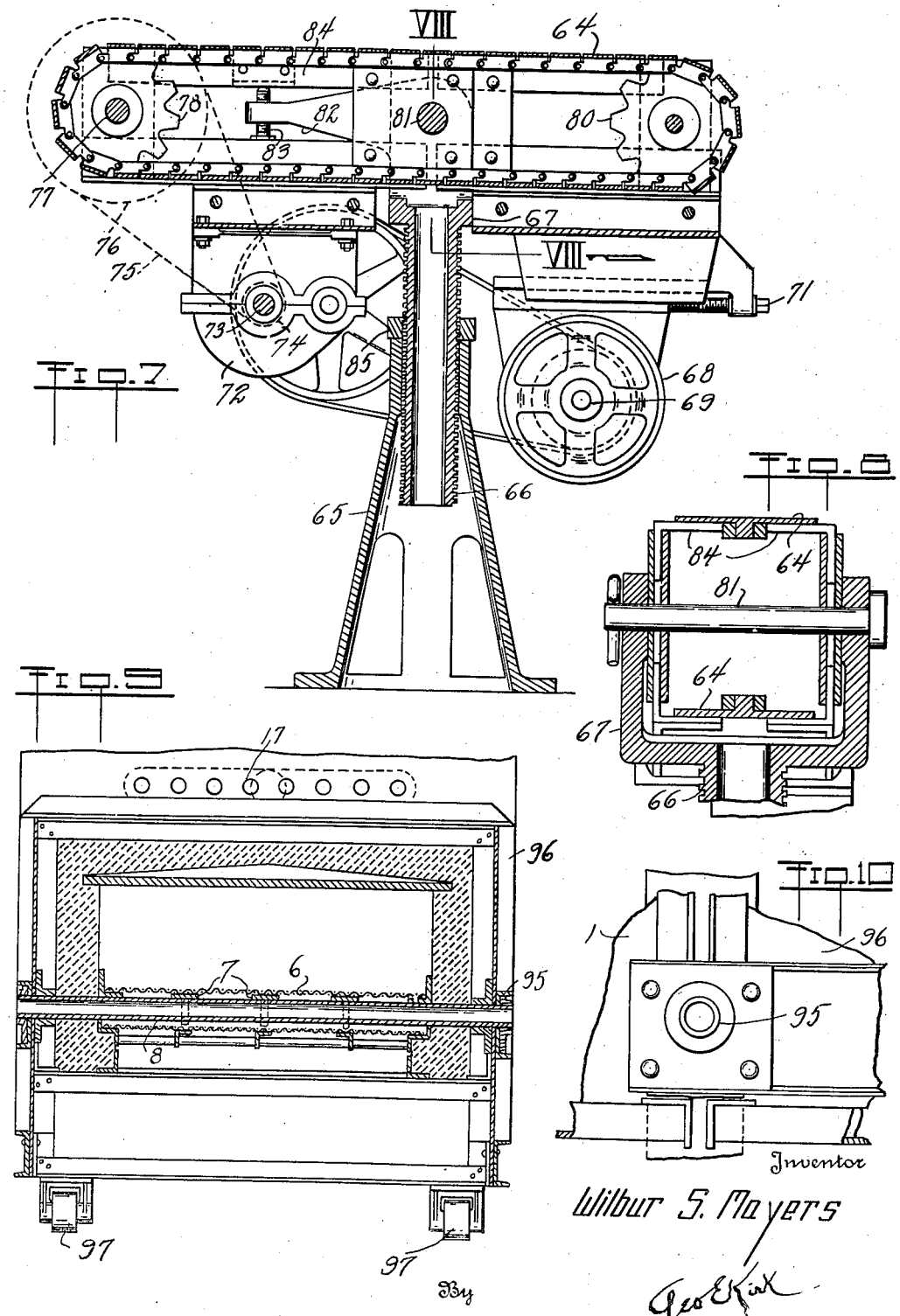

Nov. 5, 1940.  W. S. MAYERS  2,220,454
LEHR CHARGER
Filed Feb. 14, 1938  6 Sheets-Sheet 4
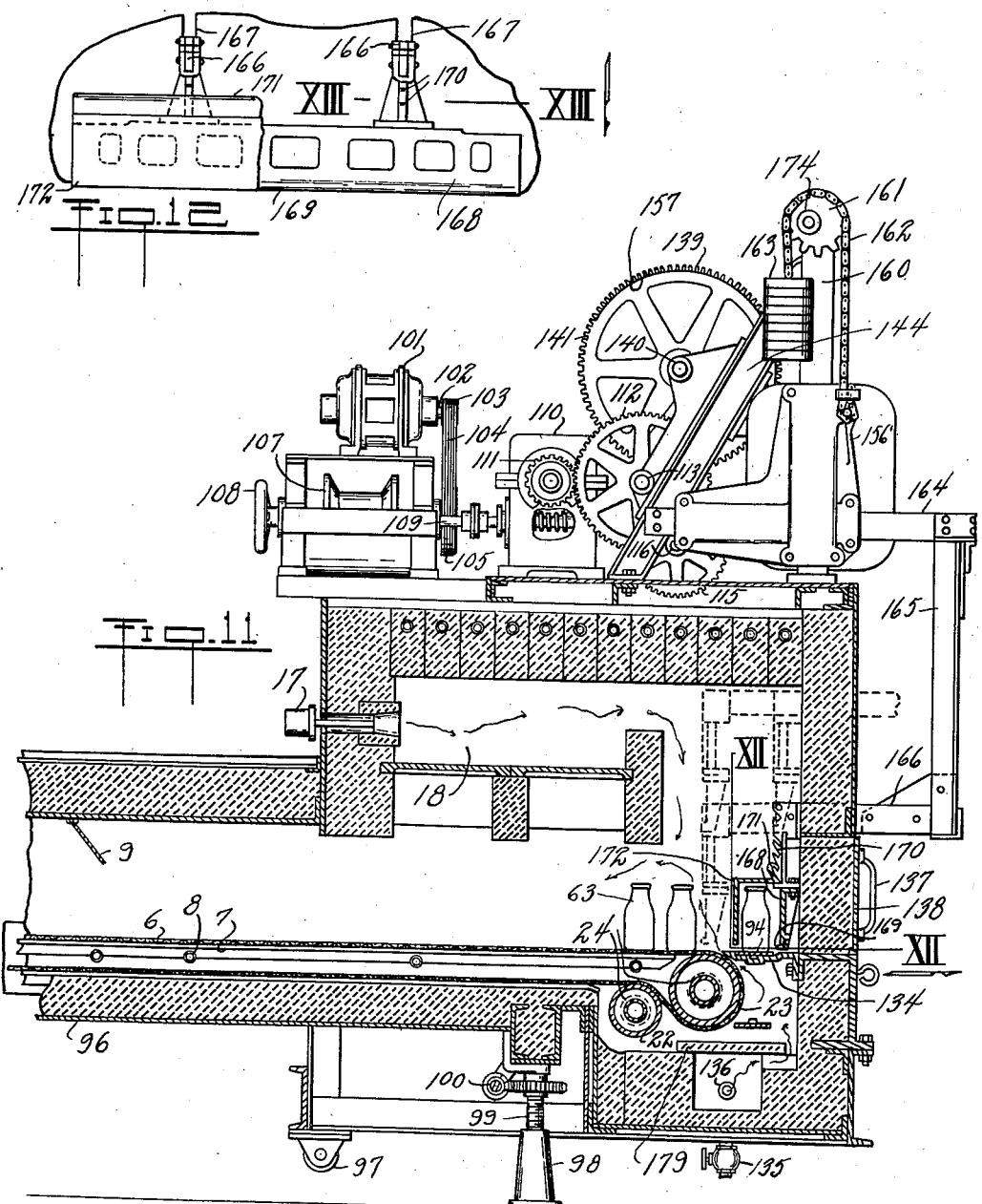
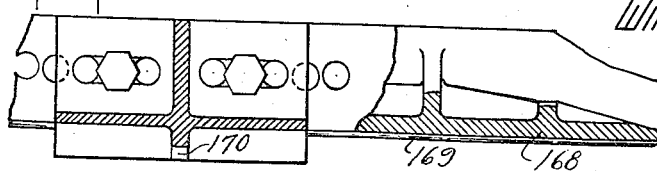
Inventor
Wilbur S. Mayers
By
Attorney

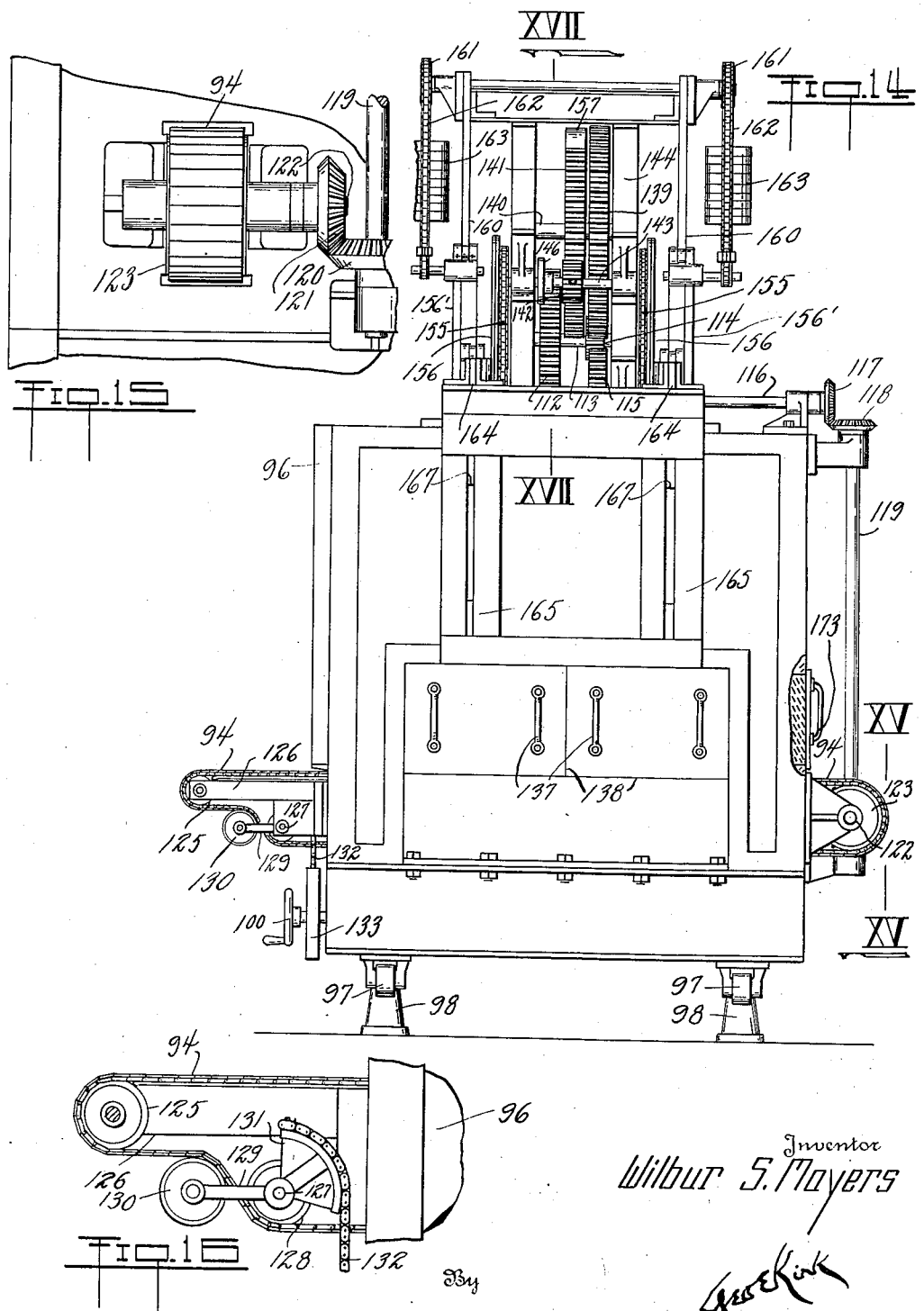

Nov. 5, 1940. W. S. MAYERS 2,220,454
LEHR CHARGER
Filed Feb. 14, 1938 6 Sheets-Sheet 6
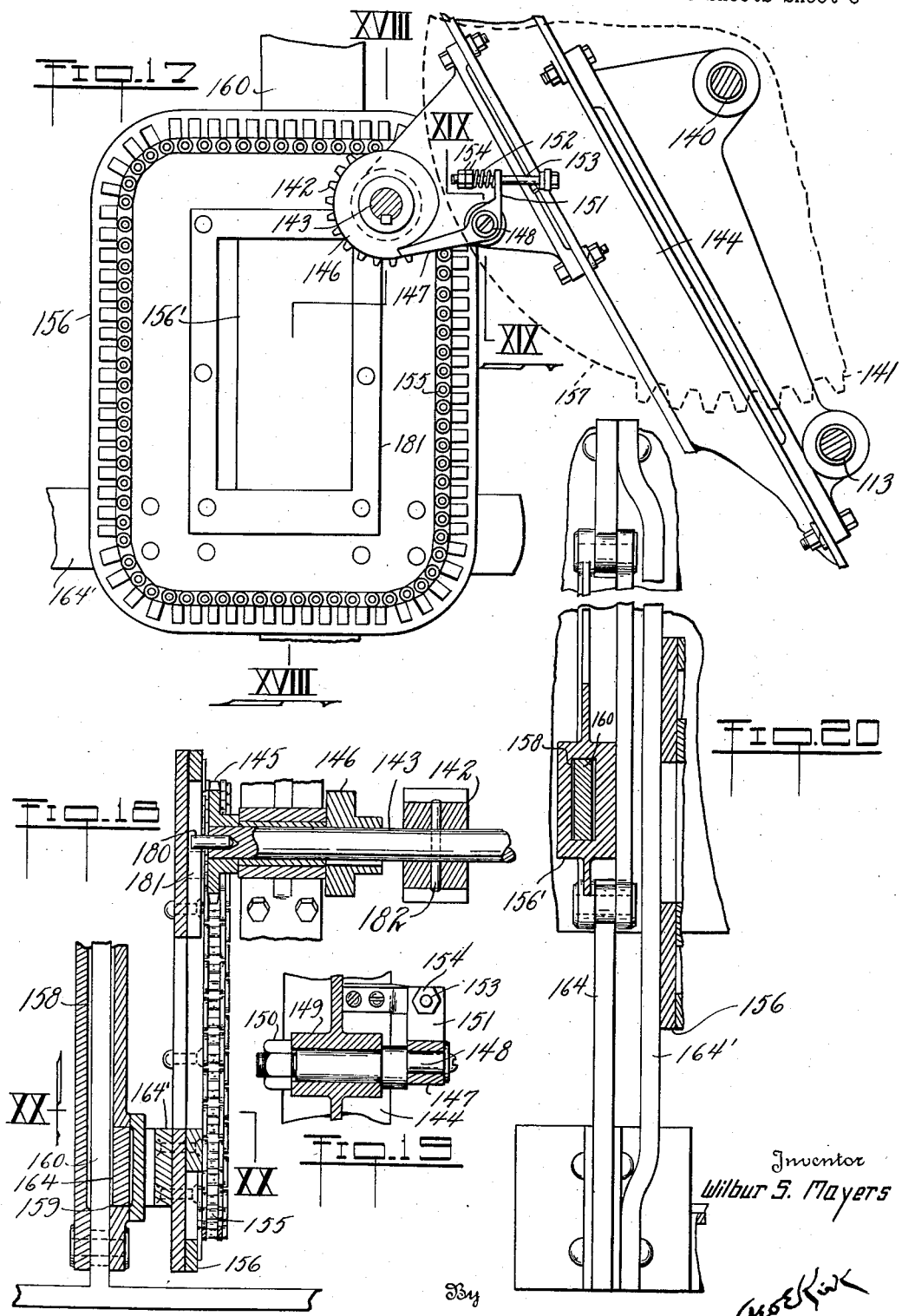
Inventor
Wilbur S. Mayers
By Geo E Kirk
Attorney Patented Nov. 5, 1940

2,220,454

UNITED STATES PATENT OFFICE 2,220,454

LEHR CHARGER

Wilbur S. Mayers, Toledo, Ohio, assignor to The Frangeo Company, Toledo, Ohio, a corporation of Ohio Application February 14, 1938, Serial No. 190,378

4 Claims. (Cl. 198—31)

This invention relates to temperature control and heat treatment incidental to continuous travel, especially of glass ware.

This invention has utility when incorporated in lehrs for taking ware from forming machines, and delivering such ware ready for use, packing, or storage.

Referring to the drawings:

Fig. 1 is a side elevation, with parts broken away, of an embodiment of the invention in a lehr;

Fig. 2 is an enlarged section on the line II—II, Fig. 1, showing the lehr conveyor belt tightener connections;

Fig. 3 is a section on the line III—III, Fig. 2, showing a fragmentary view in vertical section of the lehr adjacent the discharge end;

Fig. 4 is a fragmentary plan view of supply and charging features for this lehr;

Fig. 5 is an end view from the top of Fig. 4 of the transfer disk showing the drive therefor and adjustment as to height;

Fig. 6 is a diagrammatic showing of the ware handling conveyors adjustable as to each other for continuous plane handling of different heights of ware;

Fig. 7 is a section of the supply conveyor on the line VII—VII, Fig. 5;

Fig. 8 is a section through the mounting of the supply conveyor on the line VIII—VIII, Fig. 7;

Fig. 9 is a section through the hinge connection of the adjustable tunnel section on the line IX—IX, Fig. 1;

Fig. 10 is a side elevation showing details of the bearing mounting the frame carrying the vertically shiftable tunnel or lehr portion;

Fig. 11 is a section on the line XI—XI, Fig. 4, showing features of the adjustable tunnel section, the tunnel heaters, as well as the charging conveyor and transfer therefrom in the lehr tunnel;

Fig. 12 is a view on the line XII—XII, Fig. 11, looking into the transfer or pusher which effects ware shifting from the cross-conveyor to the endless conveyor of the lehr;

Fig. 13 is a view of the transfer on the line XIII—XIII, Fig. 12;

Fig. 14 is an end elevation of the lehr from the right of Fig. 11, showing features of the cross-conveyor drive and control features for the transfer within the lehr tunnel;

Fig. 15 is a detail view, with parts broken away, of the cross lehr drive from the line XV—XV, Fig. 14;

Fig. 16 is a detail view of cross lehr conveyor adjustment control as shown at the left of Fig. 14;

Fig. 17 is a section on the line XVII—XVII, Fig. 14, showing the endless rack control for the transfer within the lehr;

Fig. 18 is a section on the line XVIII—XVIII, Fig. 17, showing the transmission connection from the drive at the rack to the movable ware shifter or transfer means;

Fig. 19 is a section on the line XIX—XIX, Fig. 17, showing the adjustable mounting for the pawl to hold the transfer at its position of rest; and Fig. 20 is a section on the line XX—XX, Fig. 18, showing features of the horizontal guide control for the transfer-effecting member.

Lehr tunnel

Primary tunnel 1 (Fig. 1) has heat insulation jacket 2 and way 3 therethrough. This tunnel is carried by depending legs 4 mounted on rollers 5 so the general structure is portable or shiftable. In this tunnel is primary mesh-conveyor belt 6 having its upper reach (Figs. 9, 11) supported by grids 7 and cross bars 8 at its higher temperature portion. Depending partitions 9 may be controlled as to their position to retard ventilation, which ventilation is further controlled by dampers 10 in flues 11 leading to ducts 12 to pass away by stack 13 as fixed to the shielding means in the temperature control (Fig. 1).

This insulation jacket 2 may be along this tunnel 1 as the temperature drops from that of reception in the instance of handling glass ware to be annealed, and as such insulation wall is reduced, there may be open top 14 with control leaves 15 thereover for a section and then merging into open way 16. Associated with the shielding means in this temperature control there may be burners 17 at firebox 18 (Fig. 11), say for gaseous or oil fuel, thereby developing temperature for the closed receiving end of this tunnel of say around 1100° F., which may be stepped down say to 950° F. in the region of the first flues, thence in stages to 800° F., 650° F., and down to the region of 300° F. or 400° F. near the leaves 15. This temperature control may be determined according to the mass of the ware and sufficient body therein to sustain such under the transit conditions. As the temperature is reduced, instead of the grid and bar supports for the conveyor in the high temperature region, there may be rollers 19 (Fig. 3) for this endless conveyor toward discharge or delivery end 20. The return or idle reach of this conveyor belt may be carried below the upper reach by rollers 21 to pass guide roller 22 (Fig. 11) to primary conveyor lehr terminus roller 23. The shafts 24 for the rollers 22, 23, may be open or hollow, connected by side duct 24' (Fig. 4) with blower 25 for holding the temperature of these shafts down sufficiently to retain rigidity therefor in the lehr operation herein as a continuous drive.

Lehr drive

Adjacent the discharge end 20 from this tunnel, there may be located below the lower reach of this conveyor belt 6, motor 26 (Figs. 2, 3) having shaft 27, on which is mounted sprocket wheel 28 effective through sprocket chain 29 to drive sprocket wheel 30 on shaft 31 of variable speed transmission device 32. Protruding from the side of the conveyor is handle 33 effective to operate shaft 34 and adjust this variable speed device in the desired ratio. Therefrom the transmission is through speed reduction mechanism 35 to shaft 36 having sprocket 37 from which extends sprocket chain 38 to sprocket 39 on shaft 40. Pinion 41 on this shaft 40 is in mesh with pinion 42 on shaft 43 and pinion 44 on shaft 45. On the shafts 43 and 45 are cylindrical rolls 46 having thin rubber coating 47 as a friction holding means for the wraps of this wire mesh conveyor belt 6 in passing for large angle of contact about the upper roller 46 on the shaft 43, thence about roller 48 to wrap about the roller on the shaft 45, thence about roller 49. These rollers 48, 49, are in frame 50 mounted in slide way 51 and may be effective as an endless conveyor tightening device as adjusted relatively to the driving rollers on the shafts 43, 45.

This frame 50 at each side of the lehr has internally threaded eye 52 (Fig. 2) with which may engage threaded stem 53 terminating in worm pinion 54 in mesh with worm 55 on transverse shaft 56 protruding to have handle 57 so that such may be manually operated in providing slack or taking up slack in the conveyor 6 as may be proper for operating conditions.

In view of the width of this conveyor belt, which may be say up to 6 feet or more as desired, question of alinement between the sides of the belt may arise in the overall length, especially when such may be in the range of upward of 75 to 100 feet or more. Accordingly, the shaft 43 has bearings 58 with internally threaded bosses 59, with which may coact bolts 60 for letting out or drawing in one end or the other of this shaft 43, thereby to avoid any skew travel tendency in the conveyor primary lehr carrying belt.

Formed ware supply

Forming machine 61 (Fig. 6) may have delivery arm 62 for depositing ware 63 on conveyor 64. There may be variance in the height as well as other dimensions of this ware, and it is a factor of importance in the installation herein disclosed to care for such range of variation as well as take care of the current output of the glass forming machine or machines. The continuous travel of the lehr primary conveyor belt may accordingly be adapted to the rate of supply as well as the interval for annealing operation, which for greater mass ware is accordingly less than for thin walled or lighter ware. The drive for the lehr conveyor has its range of control. The lehr charging cross-conveyor has drive for adapting to the supplies thereto and according to the requirements sought. The supply is adaptable for conforming to the formed ware supply and transit therefrom.

The supply device proper embodies independent power driven mechanism of wide range of adaptation. To this end, base 65 (Figs. 5, 7, 8) has screw 66 for adjusting height, as carried thereby, of brackets 67. Suspended from this bracket 67 is motor 68 having shaft 69 with change speed device 70 therefrom having control 71 therefor. From this change speed device 70 there is speed reduction device 72 having shaft 73 with sprocket 74 thereon connected by sprocket chain 75 with sprocket wheel 76 on shaft 77 having sprocket wheel 78 to drive conveyor belt 64 as carried by the bracket 67 and extending about idler 80. This bracket 67 above the adjusting screw 66 has hingeshaft 81. This bracket 67 has fixed therewith and extending from shaft 81 arm 82 carrying adjusting screw 83, effective upon section 84 hinged on the shaft 81 to rock such section 84, together with the conveyor 64 for determining different relative vertical height positions; while the supply end of this conveyor adjacent the roll 80 may maintain the desired receiving position from the ware forming machine. This adjustment of the height for the roller 80 is determined by nut 85 on the stem 66. The shaft 77 extends outward from the conveyor belt 64 to carry worm 86 in mesh with worm wheel 87 on vertical shaft 88 carrying transfer disk 89, thereby driven from this supply conveyor drive.

Adjustably fixed with this transfer disk 89 by clamping screw 90 (Fig. 4) is slotted arm 91 carrying guide 92. This guide, in cooperation with complementary guide 93, may determine the line of travel of ware from the supply conveyor 64 past and over the transfer disk 89 to cross-conveyor 94. The adjustment by the screw 83 (Fig. 7) effects the shifting not only of the supply conveyor discharge end but the transfer disk 89 to bring such as a unit into the desired relative leveling relation with the cross-conveyor 94, so that the ware transit is continuous with appropriate common plane for such passage.

Adjustable receiving end of tunnel

The lehr 1, remote from its delivery end 20, has joint 95 (Figs. 1, 9, 10) for relatively vertically adjustable section 96 with shorter mounted roller 97. In practice adopted hereunder, for a 9-inch swing, the drop from alignment or horizontal is approximated at 4½ inches, so that this roller 97 may be in proper shifting position for the lehr unit at the lower operating position. However, for holding or shifting there are interposed bases 98 (Fig. 11) having stems 99 downwardly shiftable by transversely extending drive devices 100, so that these may be operated simultaneously for bringing the receiving end of the lehr into proper or required height position as to range for ware to be received as supplementing the limits or avoiding adjusting for limit as to the supply conveyor.

Lehr feeding cross-conveyor

This adjustable tunnel section 96 (Figs. 4, 11) has mounted thereon motor 101 having shaft 102 with pulley wheel 103, from which extends belt 104 to pulley wheel 105 mounted on shaft 106 to change speed device 107, adjustable by hand wheel 108. This change speed device 107 has therefrom shaft 109 to speed reduction device 110 effective to drive pinion 111 in mesh with gear 112 on shaft 113. This shaft 113 carries pinion 114 (Fig. 14) in mesh with gear 115 on shaft 116, which extends laterally over the side of the lehr to carry bevel gear 117 in mesh with bevel gear 118 on vertical shaft 119; at the lower end effective through bevel pinion 120 (Fig. 15) to drive bevel pinion 121 on shaft 122 carrying pulley 123, driving cross-conveyor 94 (Fig. 16). This cross-conveyor 94 extends transversely through the lehr and has at its other end pulley 125 mounted by bracket 126.

At the lower reach of this conveyor belt is located automatic belt tightener comprising shaft 127 carrying guide roller 128. This shaft 127 has thereon arm 129 carrying roller 130 to engage the opposite side of the conveyor belt. Fixed with this arm 129 is quadrant 131 having sprocket chain 132 therefrom to weight 133, tending normally to lift the roller 130 to take up slack in the lower reach of this transverse or cross-conveyor belt 94.

There is located below this cross-conveyor directing brackets 134 (Fig. 11) for maintaining coplanar registry of the upper reach of this conveyor belt 94 with the primary conveyor 6 of the lehr. Additionally, there is provided manually controllable valve 135 for burner 136, effective to supplement the primary burner or adjustable temperature control 17 above the lehr conveyor. This is a safeguard against undue chilling of the entering ware. Access to the lehr at this closed end is effected by grasping handles 137 to remove insulation blocks 138. The variable speed drive 107 may be adjusted for affecting the speed of this cross-conveyor in desired rate of travel relatively to the supplied ware and its character, for the coordinately independently adjusted and independently driven conveyor 6 of the lehr. Thereby it is practicable for maximum capacity consistent with the treatment to be effected. Also, there is possible range for maximum capacity of output and minimum expense.

*Within the lehr transfer*

This transfer is synchronized with the cross-lehr conveyor. This synchronizing is effected by having common drive therefor. Accordingly, from this shaft 113 (Figs. 4, 11, 14) the pinion 114 is in mesh with gear 139 as well as the gear 115. The gear 139 is on shaft 140 and is effective to drive mutilated companion gear 141. The mesh or toothed portion of this gear 141 is effective at pinion 142 on shaft 143 fixed for rotation in bracket 144 mounted on the lehr section 96.

Rotatable with this pinion 142 is sprocket wheel 145 (Fig. 18). Adjacent this sprocket wheel 145 is single tooth ratchet disk 146 adapted to be engaged by pawl 147 (Fig. 17) having eccentric fulcrum mounting 148 (Fig. 19), angularly adjustable as a crank on bearing 149 by clamp nut 150.

Fixed with this pawl 147 is arm 151 (Figs. 17, 19) engaged by compression spring 152 on bolt 153 as holding means adjusted by nuts 154, yieldably urging the pawl 147 into engagement with the tooth of the ratchet 146. This sprocket wheel 145 is in mesh with endless cycle-providing rack 155, herein shown as an endless sprocket chain mounted in frame 156. The tooth relationship between the sprocket wheel 145 and the teeth 155 of the rack effect a definite predetermined relation, which as to blank 157 of the mutilated gear 141, in the set-up herein, positions the member to be moved at a down position for rest along the cross-conveyor on the side of the cross-conveyor away from the lehr.

Frame 156' has therethrough vertical guideway 158 (Figs. 18, 20) and, at right angles thereto, horizontal guide-way 159. Bar 160 in the guide-way 158 provides vertical direction control for this slide or shiftable frame 156'. This guide bar 160 (Figs. 4, 11, 14), as fixed with the frame 144, at its upper portion carries sprocket wheel 161, about which extends sprocket chain 162 connected to the slide 156' on one side. This sprocket chain 162, passing about the sprocket wheel 161, on the opposite side carries counterweights 163. There is thus provided a balancing means for the transfer member vertically which has the lift and descent control through the pair of guides 160. In the horizontal guides 158 are guide bars 164 having connection 164' (Fig. 20) with the rack frame 156, horizontally as to the vertical guide 160. These guide bars 164 have, as protruding over the closed end of the lehr, depending members 165 with inwardly extending portions 166 through slots 167 (Fig. 14) to carry inside the lehr depending plate or pusher 168 (Fig. 11).

In this descent as determined by the rack 155, this pusher 168 may approach the bottom of the lehr as determined by the plane of the conveyors 6, 94. This position may be at a desired location near the bottom of the ware as determined by flange 169, so that in engaging the ware and pushing such transversely off the conveyor 94 to ride on the conveyor 6 as in a common plane, the ware may not tend to tilt in this line of travel as effected by the movable rack 155 in controlling this depending frame member or transfer pusher. In this push over off the cross-conveyor 94, the distance is such beyond the width of this conveyor 94 that the ware is effectively delivered to the conveyor 6. The speed of such delivery is such that incoming ware is not retarded by this movement. Furthermore, there is recover travel for this pusher only after the lift action thereon, as effected by the rack 155, is to a height clear of the incoming ware for this pusher side 168, before such is retrieved backward toward the closed end of the lehr and then allowed to descend on the side of the conveyor 94 away from the lehr conveyor 6; and, as in such position, may have a period of rest for an interval to allow the incoming ware again to supply articles for the transverse width of the conveyor 6. While this shifting may be continuous, it is desirable that the pusher transfer be at a speed greater than the supply rate for incoming ware so that, in transferring a push over or group from the conveyor 94, there is not an interception of flow or travel of incoming ware. There is thus provided speed up for the push off. This variable velocity from a constant speed drive is adapted in practice to develop a period of rest for this pusher of as much as one-half the time interval therefor. During this period there may be an accumulation of ware to complete the charging quantity to be pushed off the cross-conveyor 94.

At this speed of transfer, it is important there be not hazard toward upsetting the ware. Accordingly, depending portion of the pusher from the bar 164 may have notches 170 with which may engage cross hook 171 to carry steadying device 172 in a desired height position on the opposite side of the ware from that receiving the pushing contact. It is thus seen that the vertical adjustment for this adjustable section 96 of the lehr is one nicely effected as a unit with this cross-conveyor 94. Accordingly, in caring for different heights of ware, whether above or below the plane of the main lehr conveyor 6 as away from the section 96, there may be adjusted relationship thereto for the cross-conveyor. Furthermore, the driving ratio between this cross-conveyor and the transfer are nicely synchronized from a common source. These predetermined controls are factors in efficiency in operation to avoid hazard to the ware, even at a high rate of output, say in a range of twenty-five to over forty articles per minute, which articles may be supplied in a row by the conveyor 94.

*Operation*

In practice hereunder, the lehr may be brought to desired relationship with the ware forming machines. Such major relation may have supplemental adjustment effected by the supply conveyor and its transfer disk placed in the desired angular relation to take care of height condition and speed of production as to the rate of travel. With such adjustment for the supply conveyor 64, the cross-conveyor 94 may have its speed adapted thereto for the desired proximity in placing the ware together with the adaptation thereof to height. This control spacing may be such as to clear the sides of the lehr at the time for pushing off this cross-conveyor 94 to the primary conveyor 6 in the lehr. With the ware as traveling into the lehr and the common drive for the cross-conveyor and the transfer within the lehr, such are as adjusted for receiving the ware from the supply conveyor coordinated with the lehr conveyor in completing the feeding transfer automatically. The range of adjustments for speed and temperature are effective in output control and output timing. The lighter walled ware may be more rapidly annealed and accordingly with speed-up in the conveyor, while the heavier walled articles may require less speed with corresponding variance in temperature control. As the cross-conveyor 94 is charged for the width of the lehr with incoming ware from the forming machine, the sequence is such that the pusher 169 will thrust such ware quickly as from such conveyor 94 and as steadied by the member 172 from this conveyor 94 to the conveyor 6. At once this delivery is made to the moving conveyor 6, the rack 155 effects ascent of this pusher and its steadying member 172 clear of the ware, then receding of such to above the original position, and then descent to position of rest for the following charge group of articles of ware. In this position of descent, the pawl 147 holds the shaft 143 against shifting until the time sequence as determined by the mutilated portion 157 of the gear 141. The ware accordingly travels through the lehr and has its temperature reduced gradually for the finished ware to be delivered therefrom. The lehr conveyor 6 is adjusted as to alignment, tension and speed and the heat control.

The pawl 147 (Figs. 17, 18) so locks the angular relation between the toothed gear 141 on the shaft 140 as to the pinion 142 on the shaft 143 that there is maintained timing or angular relation therebetween during the interval of rest when the shaft 140 rotates the gear 141 in the non-driving position or with the mutilated portion 157 effective. In practice, this relation, instead of being one-half mutilated portion 157, may be more or less, even to absence. A ratio as adopted in practice has been for the gear 142 to have fourteen teeth as against the gear 139 having eighty-four teeth. From this it follows that its companion gear 141 has forty-two teeth effective and the mutilated portion cleared as to forty-two teeth. In this ratio, the rack 155 has had eighty-eight teeth as against twenty-two teeth in the sprocket 145. The functioning has worked out for three rotations of the sprocket 145, notwithstanding its twenty-two teeth to complete a cycle about the eighty-eight teeth of the rack. It is thus seen that the drive from the shaft 140 is a time control determining the sequence for rest or the position along the cycle for this transfer or push-over device.

The placing of the steadying device 172 in position or in shifted position is readily accomplished by pulling out or removing insulation block or door 173 (Fig. 14) thereby giving access along the side of the pusher so that such may be placed in a different position as to the notches 170 or removed in the substitution of the steadying device to be inserted. As this adjustment is effective, the door 173 is pushed back in position clear of the cross-conveyor 94.

Hub 174 (Fig. 11) for the sprocket wheel 161 is eccentric, having its longer radius side at the down position for the transfer device portions 156', 164. At the lift position, that is, when the rack frame 156 is lifted so that the arm 166 from the pusher is at the high position, then the unbalanced counterweight 163 has descended, the wheel 161 has rotated 180°, and this longer arm from the hub 174 is on the side of the counterweight 163. Accordingly, there is automatic adjustment for this counterweight to be a steadying action in the lifted position for the pull-out and for steadying action in the down position or holding and effective shoving of the ware.

Supplemental to or in lieu of the aligning means 59, 60 (Fig. 2) the shaft 56 may have sections 56', 56'', in alignment with radial clutch member 175 fixed on the shaft section 56' and radially ribbed complementary clutch disk section 176 on the shaft section 56''. Spline 177 holds this disk 176 in angular position with the shaft section 56'' as locked by set screw 178. Accordingly, upon releasing set screw 178 and sliding this clutch disk 176 clear of the clutch disk 175, the operator at the handle 57 may effect relative angular shifting of the shaft section 56'' as to the shaft section 56' in either direction, thereby shifting the shaft 43 into the desired aligning relation for the mesh conveyor 6. As such is effected, the clutch disk 176 is re-set into the meshed relation with the complementary section 175 and the set screw 178 effected to lock so that at subsequent operation of the handle 57 there is operated the shaft 56 as a unit for simultaneously effecting the adjustments with the angle of friction automatically effectively holding the parts.

The intermediate pinion 41 between the shafts 43, 45, causes such two live shafts 43, 45, to act on the non-ware carrying side of the conveyor belt 6 in extended arcs of contact for effective tractive effort augmented herein by the coating 47.

Burners 17 (Fig. 11) are primary burners herein as to the combustion chamber 18 with down draft induced therefrom by the flues 11 leading to the ducts 12 and stack 13. This brings the heat in the desired annealing relation for the ware to be tempered or handled. However, in practice there may at times be desired supplemental niceties in temperature control to be effected by the auxiliary burner 136, from which the heat naturally rises to warm the ware as on the pusher and as passing therefrom to the conveyor 6. This nicety of control is regulated not only as to the control valve 135 but in regulating the amount of such heated draft by the port opening left narrow or wide by shifting the insulation block or partition 179.

In this cycle of the fixed rack 155, the shaft 143 has protruding therefrom pin 180 (Fig. 18) to ride clear of rectangular frame 181 (Figs. 17, 18). There is accordingly a supplemental control. At the corners the sprockets hold this sprocket wheel 145 against radial shifting. However, as along a straight edge, that is, for vertical or horizontal extent of travel, there might be a tendency from some source of disturbance to shift or prevent or effect travel of the sprocket teeth out of mesh relation. This is precluded because this pin 180 is in such proximity to the rectangular frame 181 that clearance from such source is not possible. However, if in machine operation there be untoward disturbing condition, the machine is not wrecked thereby, for the pinion 142 has frangible pin 182 (Fig. 18) keying such with the shaft 143.

What is claimed and it is desired to secure by Letters Patent is:

1. A lehr charger embodying a cross-conveyor, a take-off for ware laterally therefrom embodying a ware-engaging member, and a closed cycle rack device for actuating the member comprising a fixed axis rotary shaft, a gear on said shaft, a frame, a guide in which the frame is reciprocable, an endless toothed means fixed with the frame to form a pattern, said means being in mesh with the gear for thereby driving the frame in the pattern of said means.

2. A lehr charger embodying a cross-conveyor, a take-off for ware laterally therefrom embodying a ware-engaging member, and a movable rack device for actuating the member, there being intermittently effective transmission connection for the device, said device comprising a rotary shaft, relatively fixedly mounted bearing means for the shaft, a sprocket on said shaft, a frame, an endless sprocket chain fixed with the frame to form a pattern, said chain being in mesh with the sprocket, thereby to drive the frame in the pattern of said chain, said frame having intersecting ways, a bar coacting with one of said ways for one travel direction control of the frame, and a pusher carrying bar from the other way for transmitting pattern travel from the frame.

3. A lehr charger embodying a cross-conveyor, a take-off for ware laterally therefrom embodying a ware-engaging member, an endless pattern-providing reciprocable device for actuating the member, a counterweight therefor, and connecting means between and movable relatively to and during the shifting of the take-off and counterweight for varying the action of the counterweight as to the take-off.

4. The combination of a primary conveyor, a secondary cross-conveyor adjacent the terminus of the primary conveyor, a transfer device from the cross-conveyor to the primary conveyor comprising a frame, an endless sprocket forming a rack in the frame providing a pattern, a fixed drive toothed member for the pattern, and transmission including mutilated gears determining timing sequence for the frame.

WILBUR S. MAYERS.